(12) United States Patent
Chatterji et al.

(10) Patent No.: US 6,417,142 B1
(45) Date of Patent: Jul. 9, 2002

(54) DEFOAMING METHODS AND COMPOSITIONS

(75) Inventors: Jiten Chatterji, Duncan; Roger S. Cromwell, Walters; Bobby J. King; Frank Zamora, both of Duncan, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/969,279

(22) Filed: Oct. 2, 2001

(51) Int. Cl.$^7$ ............... B01D 19/04; C09K 3/00
(52) U.S. Cl. ............ 507/265; 507/267; 507/269; 507/921; 516/133
(58) Field of Search ............ 516/133; 507/202, 507/265, 267, 269, 921

(56) References Cited

U.S. PATENT DOCUMENTS

| | | | | |
|---|---|---|---|---|
| 2,271,696 A | * | 2/1942 | Jones ............ | 516/133 |
| 3,304,266 A | | 2/1967 | Sullivan ............ | 516/116 |
| 3,560,403 A | | 2/1971 | O'Hara et al. ............ | 516/34 |
| 3,763,021 A | | 10/1973 | Householder ............ | 203/20 |
| 3,959,175 A | * | 5/1976 | Smith et al. ............ | 516/133 |
| 4,258,790 A | | 3/1981 | Hale ............ | 166/293 |
| 4,631,145 A | | 12/1986 | Zychal ............ | 516/132 |
| 4,780,220 A | | 10/1988 | Peterson ............ | 501/107 |
| 5,015,273 A | | 5/1991 | Hamilton et al. ............ | 95/242 |
| 5,169,561 A | | 12/1992 | Gentle et al. ............ | 516/116 |
| 5,523,019 A | | 6/1996 | Kim ............ | 516/116 |
| 5,547,022 A | | 8/1996 | Juprasert et al. ............ | 166/263 |
| 5,707,940 A | * | 1/1998 | Bush et al. ............ | 507/134 |
| 5,858,928 A | | 1/1999 | Aubert et al. ............ | 507/128 |
| 5,942,469 A | | 8/1999 | Juprasert et al. ............ | 507/202 |
| 6,156,808 A | | 12/2000 | Chatterji et al. ............ | 516/116 |
| 6,297,202 B1 | | 10/2001 | Chatterji et al. ............ | 507/261 |

FOREIGN PATENT DOCUMENTS

| | | | | |
|---|---|---|---|---|
| AU | | 562912 | 6/1987 | ............ C08G/77/04 |
| EP | | 0 091 257 B1 | 10/1983 | ............ B01D/19/04 |
| EP | | 0 339 762 A2 | 11/1989 | ............ C09K/7/02 |
| EP | | 0 351 828 B1 | 1/1990 | ............ B01D/19/04 |
| EP | | 0 475 568 A1 | 3/1992 | ............ C04B/28/02 |
| GB | | 2218136 A | 11/1989 | ............ E21B/21/06 |
| GB | | 2 244 279 A | 11/1991 | ............ B01D/19/04 |
| GB | | 2 243 559 B | 10/1994 | ............ B01D/19/02 |
| WO | | WO 91/00763 | 1/1991 | ............ B01D/17/00 |
| WO | | WO 91/01171 | 2/1991 | ............ B01D/17/00 |

OTHER PUBLICATIONS

Russian Abstract No. 576073, Derwent Publications, week 199338, London.

* cited by examiner

*Primary Examiner*—Daniel S. Metzmaier
(74) *Attorney, Agent, or Firm*—Craig W. Roddy; C. Clark Dougherty, Jr.

(57) ABSTRACT

The present invention provides methods and defoaming compositions for preventing the formation of foam or the entrainment of gas in a liquid fluid or for breaking a previously formed liquid fluid foam. The defoaming compositions of the invention are basically comprised of a mixture of glycerol tristearate and one or more aliphatic hydrocarbons selected from the group of olefins having one or more internal double bonds and having 14 to 18 carbon atoms and a $C_{10}$ dimer of the formula

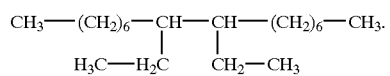

24 Claims, No Drawings

DEFOAMING METHODS AND COMPOSITIONS

BACKGROUND OF THE INVENTION

1. Field of the Invention

The present invention relates to defoaming methods and compositions, and more particularly, to such methods and compositions for preventing the formation of foam and the like or breaking foam in liquid fluids.

2. Description of the Prior Art

Defoaming compositions have long been used in the oil and gas industry and other industries to prevent the formation of a foam or the entrainment of a gas in a liquid fluid or to destroy a previously formed foam. The defoaming compositions are commonly utilized, for example, as components in well treating fluids to prevent the formation of foam or the entrainment of a gas in a liquid fluid during the preparation and or pumping of the fluid. Also, defoaming compositions have been utilized heretofore for breaking previously formed foamed liquid fluids. For example, when a stable foamed well treating fluid must be disposed of on the surface, a defoaming composition is added to the fluid to destroy the foam whereby the liquid components of the treating fluid can be readily disposed of.

A variety of defoaming compositions have been utilized heretofore. Examples of such defoaming compositions utilized in well treating fluids include tributyl phosphate and acetylenic diol, which are environmentally toxic. Other prior art defoaming agents, which have been utilized include propylene glycol and a mixture of propylene glycol with a copolymer of ethylene oxide and propylene oxide monomers. While these defoamers function adequately to prevent the formation of foam in well treating fluids when they are prepared and pumped, they do not function adequately for defoaming previously formed foamed well treating fluids, and particularly previously formed foamed well cement compositions. Thus, there is a continuing need for improved environmentally safe defoaming compositions for use in various fluids including well treating fluids.

SUMMARY OF THE INVENTION

The present invention provides improved non-toxic environmentally benign defoaming methods and compositions which meet the needs described above and overcome the deficiencies of the prior art. A method of this invention for preventing the formation of foam or the entrainment of a gas in a liquid fluid is comprised of combining a defoaming composition with the fluid, the defoaming composition being comprised of a mixture of glycerol tristearate and one or more aliphatic hydrocarbons selected from the group consisting of olefins having one or more internal double bonds and having 14 to 18 carbon atoms and a $C_{10}$ dimer of the formula

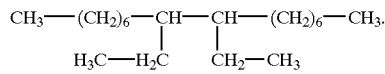

Another method of this invention for defoaming a foamed liquid fluid comprises combining a defoaming composition with the fluid, the defoaming composition being as described above.

A non-toxic environmentally benign defoaming composition for preventing the formation of foam or the entrainment of a gas in a liquid fluid or for defoaming a foamed liquid fluid is comprised of a mixture of glycerol tristearate and one or more aliphatic hydrocarbons selected from the group consisting of olefins having one or more internal double bonds and having 14 to 18 carbon atoms and a $C_{10}$ dimer of the formula

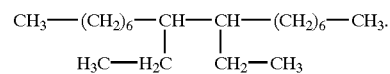

It is, therefore, a principal object of the present invention to provide improved defoaming methods and compositions.

Other and further objects features and advantages of the present invention will be readily apparent to those skilled in the art upon a reading of the description of preferred embodiments which follows.

DESCRIPTION OF PREFERRED EMBODIMENTS

As mentioned above, defoaming compositions are commonly utilized in a variety of liquid fluids to prevent the fluids from forming foam with air or entraining air when they are agitated, mixed or the like in the presence of air. In the treatment of wells with well treating fluids, the liquid fluids are commonly mixed or blended in the presence of air on the surface and then pumped into the well bore. If the well treating fluids are inadvertently foamed while being mixed and pumped, adverse results can take place. For example, in completing and stimulating a well, unfoamed treating fluids are often utilized which if foamed would not accomplish their intended purposes or would produce less than desirable results. For example, well cement compositions used for cementing pipe in well bores are generally designed to have a specific density. If during mixing or pumping the well cement composition is foamed with air or otherwise entrains air, the density of the resulting cement composition can be considerably lower than the desired or required density. Also, foam or entrained air interferes with the operation of positive displacement pumps used to pump well treating fluids.

While well treating fluids are often formed into stable foams on the surface in order to reduce the density of the fluids or for other reasons. When such stable foams must be disposed of on the surface, it is generally necessary to break the foams in order to efficiently dispose of the liquid components. While defoaming compositions have been developed and used successfully heretofore, such defoaming compositions generally have either been environmentally toxic or have produced less than desirable results when utilized to break stable foams. By the present invention, improved methods and defoaming compositions are provided which are non-toxic and environmentally benign and also produce equal or better defoaming results than the heretofore utilized defoaming methods and compositions.

The improved defoaming compositions of this invention are basically comprised of a mixture of glycerol tristearate and one or more aliphatic hydrocarbons selected from the group consisting of olefins having one or more internal double bonds and having 14 to 18 carbon atoms and a $C_{10}$ dimer of the formula

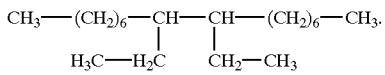

The one or more aliphatic hydrocarbons are preferably comprised of a mixture of $C_{16}$ to $C_{18}$ olefins having internal double bonds or a mixture of $C_{14}$ to $C_{16}$ olefins having internal double bonds or a dimer having the formula set forth above. Generally, the weight ratio of the glycerol tristearate to the one or more aliphatic hydrocarbons utilized is in the range of from about 5:95 to about 10:90. More preferably, the weight ratio of the glycerol tristearate to the one or more aliphatic hydrocarbons is about 8.34:91.66.

A preferred non-toxic and environmentally safe defoaming composition of this invention is comprised of a mixture of glycerol tristearate and a $C_{10}$ dimer of the formula

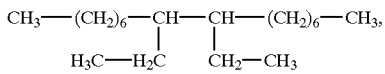

the weight ratio of the glycerol tristearate to the dimer being about 8.34:91.66.

The methods of the present invention of preventing the formation of foam or the entrainment of a gas in a liquid fluid during the preparation or pumping of the liquid fluid comprises combining a defoaming composition with the liquid fluid, the defoaming composition being comprised of a mixture of glycerol tristearate and one or more aliphatic hydrocarbons selected from the group consisting of olefins having one or more internal double bonds and having 14 to 18 carbon atoms and a $C_{10}$ dimer of the formula

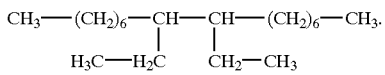

While the liquid fluid can be any liquid fluid in which it is desirable to prevent foaming or air entrainment, the defoaming compositions of this invention are useful in well treating fluids and particularly well cement compositions for preventing foaming or air entrainment while mixing or pumping such fluids. The defoaming composition is generally combined with the liquid fluid in an amount in the range of from about 0.1% to about 0.5% by weight of the fluid. As mentioned above, the defoaming composition can also be utilized for defoaming a previously prepared stable foamed liquid fluid so that the liquid components of the foamed fluid can be readily and safely disposed of. When used as a defoamer, the defoaming composition is generally combined with the foamed liquid fluid in an amount in the range of from about 0.1% to about 1.0% by weight of the liquid fluid in the foamed liquid fluid.

A preferred method of the present invention for preventing the formation of foam or the entrainment of a gas in a liquid fluid or for defoaming a previously foamed liquid fluid is comprised of combining a defoaming composition with the fluid, the defoaming composition being comprised of a mixture of glycerol tristearate and one or more aliphatic hydrocarbons selected from the group consisting of a mixture of $C_{16}$ to $C_{18}$ olefins having internal double bonds, a mixture of $C_{14}$ to $C_{16}$ olefins having internal double bonds or a $C_{10}$ dimer having the formula

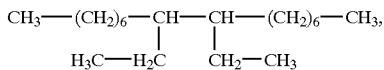

the weight ratio of the glycerol tristearate to the one or more aliphatic hydrocarbons being in the range of from about 5:95 to about 10:90.

As will now be understood, the defoaming composition of this invention can be utilized in a variety of different fluids and are particularly well suited for use in well treating fluids. Examples of well treating fluids in which the defoaming compositions can be utilized to prevent the formation of foam or the entrainment of air are aqueous gelled fluids and cement compositions. An example of a previously prepared foamed well treating fluid which can be efficiently defoamed using the defoaming composition of this invention is a stable cement composition foamed with air or nitrogen. Excess previously prepared stable foamed well cement compositions are often pumped into pits on the surface and must be disposed of. By combining a defoaming composition of this invention with the foamed cement compositions, e.g., by spraying the defoaming composition thereon, the foamed cement compositions rapidly and completely break whereby their liquid components can be readily disposed.

In order to further illustrate the defoaming compositions and methods of this invention, the following examples are given.

EXAMPLE 1

Three defoaming compositions of the present invention were prepared. The first defoaming composition (defoaming composition A) was comprised of glycerol tristearate and a mixture of $C_{16}$ to $C_{18}$ internal olefins in a weight ratio of glycerol tristearate to internal olefins of 8.34:91.66. The second composition (composition B) was comprised of glycerol tristearate and $C_{10}$ dimer of the formula set forth above wherein x was 6 and y was 1 in a weight ratio of glycerol tristearate to dimer of 8.34:91.66. The third composition (composition C) was comprised of glycerol tristearate and a mixture of $C_{14}$ to $C_{16}$ internal olefins in a weight ratio of glycerol tristearte to internal olefins of 8.34:91.66.

Test cement composition samples were prepared from five different cement slurries containing various conventional additives, i.e., a set of five cement composition samples without a defoaming composition additive, a set of five cement composition samples containing a first prior art defoaming composition additive, a set of five cement composition samples containing a second prior art defoaming composition additive, and three sets of five cement composition samples containing the three defoaming composition additives of the present invention. The components and quantities utilized in forming the various sets of five cement composition samples without the defoaming composition additives are set forth in Table I below.

TABLE I

TEST WELL CEMENT COMPOSITIONS

| Test Cement Composition Number | Premium Cement | Water, % by Weight of Cement | Crystalline Silica, % by Weight of Cement | Sodium Chloride, % by Weight of Water | Weighting Agent[1], % by Weight of Cement | Set Retarder[2], % by Weight of Cement | Fluid Loss Control Agent, % by Weight of Cement | Gas Ban[6], % by Weight of Cement | Dispersing Agent[4], % by Weight of Cement |
|---|---|---|---|---|---|---|---|---|---|
| 1 | Yes | 46 | 35 | 37.2 | 49 | 1 | 0.6[3] | — | — |
| 2 | Yes | 38 | — | 37.2 | — | 1 | — | — | — |
| 3 | Yes | 43 | — | 35 | — | 1 | 0.05[5] | — | 0.3 |
| 4 | Yes | 61 | — | — | — | — | — | 1 | — |
| 5 | Yes | 46 | — | — | — | — | 0.8[3] | — | — |

[1] Iron oxide
[2] Modified lignosulfonate
[3] Hydroxyethylcellulose
[4] Condensation product of formaldehyde, acetone and sodium bisulfate
[5] Carboxymethylhydroxyethylcellulose
[6] Copolymer of 2-acrylamido-2-propanesulfonic acid and N,N-dimethylacrylamide The theoretical design density of each of the test cement composition samples was determined as was the density of each test cement composition sample which did not include a defoaming composition additive. The density of each test cement composition sample including a prior art defoamer and the density of each test cement composition sample including one of the three defoaming compositions of the present invention (defoaming compositions A, B and C) was determined. The results of these tests are given in Table II below. The prior art defoaming composition additives and the defoaming composition additives of the present invention were combined with the test cement composition samples in amounts of 0.25% by weight of cement therein.

ethyl amine oxide surfactant in an amount of 1% by weight of the cement, water in an amount of 42% by weight of the cement, and a prior art or present invention defoaming composition additive in an amount of 1% by volume of foamed slurry.

Prior to combining the prior art or present invention defoaming composition additives to the cement composition samples, the unfoamed test cement composition had a density of 16.2 lbs. per gallon and after being foamed, the composition had a density of 10.0 lbs. per gallon. The density of each test cement composition sample was determined and the results are given below.

TABLE II

DEFOAMER EFFICIENCY TESTS

| Test Cement Composition Number | Design Density, lb/gal | Density with No Defoaming Composition Additive, lb/gal | Density of Prior Art Defoaming Composition Additive[1], lb/gal | Density of Prior Art Defoaming Composition Additive[2], lb/gal | Density of Defoaming Composition A[3], lb/gal | Density of Defoaming Composition B[4], lb/gal | Density of Defoaming Composition C[5], lb/gal |
|---|---|---|---|---|---|---|---|
| 1 | 19.2 | 17.3 | 18.75 | 18.7 | 18.75 | 18.7 | 18.75 |
| 2 | 16.8 | 13.2 | 16.7 | 16.45 | 16.65 | 16.65 | 16.65 |
| 3 | 16.4 | 12.8 | 16.25 | 16.0 | 16.2 | 16.25 | 16.2 |
| 4 | 14.4 | 13.4 | 14.35 | 14.35 | 14.3 | 14.3 | 14.3 |
| 5 | 15.6 | 14.9 | 15.6 | 15.6 | 15.6 | 15.6 | 15.6 |

[1] Polypropylene glycol, activated silica and $C_{12}$–$C_{14}$ internal olefins
[2] Rape seed oil, propylene glycol and aluminum stearate
[3] Glycerol tristearate and $C_{16}$–$C_{18}$ internal olefins at a weight ratio of 8.34:91.66.
[4] Glycerol tristearate and $C_{10}$ dimer wherein $x$ is 6 and $y$ is 1 at a weight ratio of 8.34:91.66.
[5] Glycerol tristearate and $C_{14}$–$C_{16}$ internal olefins at a weight ratio of 8.34:91.66.

From Table II, it can be seen that the defoaming efficiencies of the defoaming composition additives of the present invention substantially equal the defoaming efficiencies of the prior art defoaming composition additives.

EXAMPLE 2

Stable foamed test cement composition samples were prepared containing prior art defoaming composition additives and the defoaming composition additives of the present invention. The test cement composition samples contained the following components: premium cement, a foaming and foam stabilizing additive comprised of an ethoxylated alcohol ether sulfate surfactant, an alkyl or alkene amidopropyl betaine surfactant and an alkyl or alkene amidopropyl dim-

| Defoaming Composition Additive | Cement Composition Sample Density, lb/gal |
|---|---|
| Prior Art[1] | 11.6 |
| Prior Art[2] | 10.4 |
| Present Invention Composition A[3] | 15.3 |
| Present Invention Composition B[4] | 15.27 |
| Present Invention Composition C[5] | 15.32 |

[1-5] See Footnotes 1–5 of Table II above

From the above, it can be seen that the defoaming compositions of this invention are highly efficient in defoaming stable foamed fluids.

EXAMPLE 3

Test cement composition samples were prepared comprised of premium cement, the three defoaming composition additives (defoaming compositions A, B and C) in an amount of 0.27% by weight of cement and water in an amount of 47% by weight of cement. Three different fluid loss additives were combined with test portions of the test cement composition samples and the fluid loss for each test portion was determined in accordance with the procedures set forth in the *API Specification For Materials And Testing For Well Cement,* API Specification 10, 5$^{th}$ ed., dated Jul. 1, 1990, of the American Petroleum Institute. The test cement composition samples had densities of 15.6 pounds per gallon. The results of these tests are given in Table III below.

TABLE III

EFFECT OF DEFOAMING COMPOSITION ADDITIVES ON FLUID LOSS

| FLUID LOSS CONTROL ADDITIVE | AMOUNT, % by Weight of Cement | DEFOAMING COMPOSITION | FLUID LOSS AT 125° F., 3000 psi AND 325 MS, cc/30 min |
|---|---|---|---|
| FLUID LOSS ADDITIVE 1[1] | 1.0 | A[4] | 24 |
| FLUID LOSS ADDITIVE 2[2] | 0.6 | A[4] | 27 |
| FLUID LOSS ADDITIVE 3[3] | 1.0 | A[4] | 21 |
| FLUID LOSS ADDITIVE 1[1] | 1.0 | B[5] | 26 |
| FLUID LOSS ADDITIVE 2[2] | 0.6 | B[5] | 28 |
| FLUID LOSS ADDITIVE 3[3] | 1.0 | B[5] | 20 |
| FLUID LOSS ADDITIVE 1[1] | 1.0 | C[6] | 24 |
| FLUID LOSS ADDITIVE 2[2] | 0.6 | C[6] | 28 |
| FLUID LOSS ADDITIVE 3[3] | 1.0 | C[6] | 21 |

[1]Fluid Loss Additive 1 was hydroxyethylcellulose and naphthalene sulfonic acid condensed with formaldehyde copolymer
[2]Fluid Loss Additive 2 was 2-acrylamido-2-propanesulfonic acid and N,N-dimethylacrylamide
[3]Fluid Loss Additive 3 was hydroxyethylcellulose
[4-6]Same as footnotes 3-5 of Table II above From the results given in Table III, it can be seen that the presence of the defoaming composition additives of this invention did not materially affect the fluid losses of the test cement slurry portions.

EXAMPLE 4

Tests cement composition samples were prepared comprised of premium cement, water in an amount of 41.68% by weight of cement, calcium chloride in an amount of 2% by weight of cement and a prior art defoaming composition additive and the defoaming composition additives of the present invention in amounts of 0.27% by weight of cement. The test cement composition samples had densities of 16.12 pounds per gallon. The thickening times of the test cement composition samples were determined in accordance with the procedures set forth in the above mentioned API Specification 10. The results of these tests are given in Table IV below.

TABLE IV

EFFECT OF DEFOAMING COMPOSITION ADDITIVES ON THICKENING TIME.

| Defoaming Composition Additive | Time to Reach 70 B$_c$ at 80° F. BHCT and 2900 psi, hr:min |
|---|---|
| Prior Art Defoamer Composition Additive[1] | 2:30 |
| Defoamer Composition A[2] | 2:22 |
| Defoamer Composition B[3] | 2:15 |
| Defoamer Composition C[4] | 2:20 |

[1-4]Same as footnotes 1 and 3-5 of Table II

From the results set forth in Table IV, it can be seen that the presence of the defoaming composition additives of this invention had little effect on cement composition thickening time.

EXAMPLE 5

A test cement composition was prepared comprised of premium cement, water in an amount of 47% by weight of cement and defoaming composition A of the present invention present in an amount of 0.27% by weight of cement. The cement composition had a density of 15.6 pounds per gallon. To test samples of the test cement composition, three different fluid loss control additives were added in the amounts given in Table V below. The rheologies of each of the test composition samples were determined at temperatures of 80° F. and 125° F. The results of these tests are given in Table V below.

TABLE V

EFFECT OF DEFOAMING COMPOSITION ADDITIVES ON RHEOLOGY

| FLUID LOSS CONTROL ADDITIVE | TEMPERATURE ° F. | RHEOLOGY | | | | |
|---|---|---|---|---|---|---|
| | | 300 rpm | 200 rpm | 100 rpm | 6 rpm | 3 rpm |
| FLUID LOSS ADDITIVE 1[1] | 80 | 300 | 215 | 120 | 12 | 8 |
| | 125 | 145 | 101 | 54 | 6 | 4 |
| FLUID LOSS ADDITIVE 2[2] | 80 | 146 | 106 | 61 | 7 | 5 |
| | 125 | 118 | 90 | 53 | 6 | 5 |

TABLE V-continued

EFFECT OF DEFOAMING COMPOSITION ADDITIVES ON RHEOLOGY

| FLUID LOSS | | RHEOLOGY | | | | |
|---|---|---|---|---|---|---|
| CONTROL ADDITIVE | TEMPERATURE °F. | 300 rpm | 200 rpm | 100 rpm | 6 rpm | 3 rpm |
| FLUID LOSS ADDITIVE 3[3] | 80 125 | 241 145 | 170 90 | 96 50 | 10 6 | 6 4 |

[1-3]Same as footnotes 1–3 of Table III

From Table V it can be seen that the defoaming composition additive of the present invention does not materially affect rheology.

EXAMPLE 6

A test cement composition was prepared comprised of premium cement and water in an amount of 47% by weight of the cement having a density of 15.6 pounds per gallon. Three different fluid loss control additives were added to test portions of the cement composition with and without the defoaming composition additives of this invention. The various test cement composition portions were tested for compressive strength at 160° F. after setting for 24 hours and 48 hours in accordance with the procedures set forth in the above mentioned API Specification 10. The results of these tests are set forth in Table VI below.

TABLE VI

EFFECT OF DEFOAMING COMPOSITION ADDITIVES ON COMPRESSIVE STRENGTH

| FLUID LOSS CONTROL ADDITIVE | QUANTITY OF FLUID LOSS CONTROL ADDITIVE, % by weight of cement | DEFOAMING COMPOSITION ADDITIVE | COMPRESSIVE AT 160° F. | |
|---|---|---|---|---|
| | | | 24 Hrs | 48 Hrs |
| ADDITIVE 1[1] | 1.0 | NONE | Not Set | 2160 psi |
| ADDITIVE 2[2] | 0.6 | NONE | 1928 psi | 2330 psi |
| ADDITIVE 3[3] | 1.0 | NONE | 1978 psi | 3940 psi |
| ADDITIVE 1[1] | 1.0 | COMPOSITION A[4] | Not Set | 2290 psi |
| ADDITIVE 2[2] | 0.6 | COMPOSITION B[5] | 1862 psi | 2960 psi |
| ADDITIVE 3[3] | 1.0 | COMPOSITION C[6] | 2570 psi | 4580 psi |

[1-6]Same as footnotes 1–6 of Table III

From Table VI, it can be seen that the defoamer composition additives of this invention had little affect on compressive strength.

EXAMPLE 7

The defoaming compositions of this invention were subjected to bioassay testing. The results of the tests are given in Table VII below.

TABLE VII

BIOASSY TESTING

| Target Components | Test Organism | 96 Hrs LC$_{50}$ (mg/L SPP) | 95% Confidence Level |
|---|---|---|---|
| Generic Mud #7 | A. bahia | >1,000,000 | NA |
| Generic Mud #7 With Defoaming Composition A[1] | A. bahia | 658,700 | 446,800–971,100 |
| Generic Mud #7 With Defoaming Composition B[2] | A. bahia | 323,500 | 273,800–382,200 |
| Generic Mud #7 With Defoaming Composition C[3] | A. bahia | 219,300 | 179–267,700 |

[1-3]Same as footnotes 3–5 of Table III

From Table VII it can be seen that the test organism A. bahia shrimp when subjected to bioassy testing with the defoaming compositions of this invention were not harmed. The 96-hour A. bahia shrimp test results were all above 30,000 which indicates that the defoaming compositions are non-toxic.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of preventing the formation of foam or the entrainment of a gas in a liquid fluid comprising combining a defoaming composition with said fluid, said defoaming composition being comprised of a mixture of glycerol tristearate and one or more aliphatic hydrocarbons selected from the group consisting of olefins having one or more internal double bonds and having 14 to 18 carbon atoms and a $C_{10}$ dimer of the formula

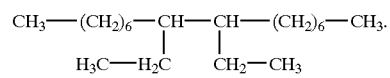

2. The method of claim 1 wherein said liquid fluid is a well treating fluid and said gas is air.

3. The method of claim 1 wherein said liquid fluid is a well cement composition and said gas is air.

4. The method of claim 1 wherein said defoaming composition is combined with said liquid fluid in an amount in the range of from about 0.1% to about 0.5% by weight of said liquid fluid.

5. The method of claim 1 wherein said one or more aliphatic hydrocarbons are a mixture of $C_{16}$ to $C_{18}$ olefins having internal double bonds.

6. The method of claim 1 wherein said one or more aliphatic hydrocarbons are a mixture of $C_{14}$ to $C_{16}$ olefins having internal double bonds.

7. The method of claim 1 wherein said one or more aliphatic hydrocarbons are a $C_{10}$ dimer.

8. The method of claim 1 wherein the weight ratio of said glycerol tristearate to said one or more aliphatic hydrocarbons is in the range of from about 5:95 to about 10:90.

9. The method of claim 1 wherein the weight ratio of said glycerol tristearate to said one or more aliphatic hydrocarbons is about 8.34:91.66.

10. A method of defoaming a foamed liquid fluid comprising combining a defoaming composition with said fluid, said defoaming composition being comprised of a mixture of glycerol tristearate and one or more aliphatic hydrocarbons selected from the group consisting of olefins having one or more internal double bonds and having 14 to 18 carbon atoms and a $C_{10}$ dimer of the formula

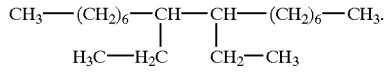

11. The method of claim 10 wherein said foamed liquid fluid is a foamed well treating fluid.

12. The method of claim 10 wherein said foamed liquid fluid is a foamed well cement composition.

13. The method of claim 10 wherein said defoaming composition is combined with said foamed liquid fluid in an amount in the range of from about 0.1% to about 1% by weight of said liquid fluid.

14. The method of claim 10 wherein said one or more aliphatic hydrocarbons are a mixture of $C_{16}$ to $C_{18}$ olefins having internal double bonds.

15. The method of claim 10 wherein said one or more aliphatic hydrocarbons are a mixture of $C_{14}$ to $C_{16}$ olefins having internal double bonds.

16. The method of claim 10 wherein said one or more aliphatic hydrocarbons are a $C_{10}$ dimer.

17. The method of claim 10 wherein the weight ratio of said glycerol tristearate to said one or more aliphatic hydrocarbons is in the range of from about 5:95 to about 10:90.

18. The method of claim 10 wherein the weight ratio of said glycerol tristearate to said one or more aliphatic hydrocarbons is about 8.34:91.66.

19. A non-toxic environmentally benign defoaming composition comprising:

glycerol tristearate; and one or more aliphatic hydrocarbons selected from the group consisting of olefins having one or more internal double bonds and having 14 to 18 carbon atoms and a $C_{10}$ dimer of the formula

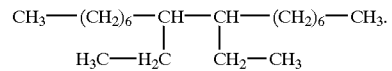

20. The composition of claim 19 wherein said one or more aliphatic hydrocarbons are a mixture of $C_{16}$ to $C_{18}$ olefins having internal double bonds.

21. The composition of claim 19 wherein said one or more aliphatic hydrocarbons are a mixture of $C_{14}$ to $C_{16}$ olefins having internal double bonds.

22. The composition of claim 19 wherein said one or more aliphatic hydrocarbons are a $C_{10}$ dimer.

23. The composition of claim 19 wherein the weight ratio of said glycerol tristearate to said one or more aliphatic hydrocarbons is in the range of from about 5:95 to about 10:90.

24. The composition of claim 19 wherein the weight ratio of said glycerol tristearate to said one or more aliphatic hydrocarbons is about 8.34:91.66.

* * * * *